US007763858B2

(12) United States Patent
Ronaldson et al.

(10) Patent No.: US 7,763,858 B2
(45) Date of Patent: Jul. 27, 2010

(54) APPARATUS AND METHOD FOR MEASURING RADIOACTIVE MATERIAL IN A MATRIX

(75) Inventors: John Paul Ronaldson, Cumbria (GB); Daniel Parvin, Cumbria (GB)

(73) Assignee: VT Nuclear Services Limited, Hampshire (GB)

( * ) Notice: Subject to any disclaimer, the term of this patent is extended or adjusted under 35 U.S.C. 154(b) by 0 days.

(21) Appl. No.: 10/547,018

(22) PCT Filed: Feb. 27, 2004

(86) PCT No.: PCT/GB2004/000829
§ 371 (c)(1),
(2), (4) Date: May 26, 2006

(87) PCT Pub. No.: WO2004/079392
PCT Pub. Date: Sep. 16, 2004

(65) Prior Publication Data
US 2007/0029490 A1    Feb. 8, 2007

(30) Foreign Application Priority Data
Mar. 1, 2003    (GB) ................... 0304721.4

(51) Int. Cl.
G21C 17/07    (2006.01)
G21C 17/10    (2006.01)
G01T 1/20    (2006.01)
(52) U.S. Cl. ................ 250/361 R; 250/252.1; 376/250; 376/251; 376/253; 376/254

(58) Field of Classification Search .......... 250/358.1, 250/360.1, 363.09, 252.1, 361 R, 363.02, 250/363.04; 376/251, 250, 253, 254; 378/207
See application file for complete search history.

(56) References Cited

U.S. PATENT DOCUMENTS

| 4,353,863 | A | * | 10/1982 | Leenders | .............. 376/251 |
| 4,605,531 | A | * | 8/1986 | Leseur et al. | .............. 376/252 |
| 4,617,169 | A | | 10/1986 | Brodzinski et al. | |
| 4,777,367 | A | * | 10/1988 | Kawasaki et al. | ........ 250/336.1 |
| 6,228,664 | B1 | | 5/2001 | Atrashkevich et al. | |
| 6,624,425 | B2 | * | 9/2003 | Nisius et al. | .............. 250/393 |

(Continued)

FOREIGN PATENT DOCUMENTS

EP    1 548 464 A1    6/2005

(Continued)

OTHER PUBLICATIONS

F. Levai, *Development of Computed Tomographic Methods for Verification of Nuclear Materials In Storage or in Closed Containers*, Kernenergie, Akademie Verlag., Berlin, Germany, vol. 32 No. 2, Feb. 1, 1989, pp. 50-57.

(Continued)

*Primary Examiner*—David P Porta
*Assistant Examiner*—Casey Bryant
(74) *Attorney, Agent, or Firm*—Workman Nydegger

(57) ABSTRACT

Methods and apparatus are provided for measuring emissions from radioactive material in a matrix. Consideration is made in the variation in counts observed at different rational positions of the body of material so as to establish the information about the position of the radioactive material within the matrix.

30 Claims, 3 Drawing Sheets

U.S. PATENT DOCUMENTS

2002/0163988 A1  11/2002  Nisius et al.
2003/0205677 A1  11/2003  Caldwell et al.
2006/0255254 A1* 11/2006  Twomey .................. 250/252.1

FOREIGN PATENT DOCUMENTS

GB      2 398 381 A       8/2004
WO      WO 01/07888 A     2/2001
WO      WO 2004/079392 A3 9/2004

OTHER PUBLICATIONS

J. Morel, et al., *A Non-Destructive Method Based on Gamma Spectrometry for the Measurements of Plutonium Hold-Up or Plutonium Wastes*, Conference Title 3. International Conference on Facility Operations Safeguards Interfaces, San Diego, California, Nov. 1987, Transactions of the American Nuclear Society, vol. 55.

Matthew R. Newell et al., *Performance of WIPP Certificate Mobile Waste Characterization NDA Measurements on TRU Waste Drums at LLNL*, Nuclear Material Management, 1998, vol. 27, No. 3, pp. 1801-1807.

IPAN/GEA Drum System, Imaging Passive-Active Neutron/Gamma Energy Assay Drum System Brochure for BNFL Instruments, Ltd., England, 1997.

IPAN/GEA Crate System, Imaging Passive-Active Neutron/Gamma Energy Assay Crate system, Brochure for BNFL Instruments, Ltd., England 1997.

J. Steven Hansen, *Tomographic Gamma Scanning of Uranium a New Lump Correction Technique*, 7th International Conference on Facility Operations—Safeguards Interface, LA-UR-04-1239, Feb. 29-Mar. 5, 2004, pp. 1-7.

* cited by examiner

APPARATUS AND METHOD FOR MEASURING RADIOACTIVE MATERIAL IN A MATRIX

BACKGROUND OF THE INVENTION

1. Field of the Invention

This invention concerns improvements in and relating to measurement, particularly of emissions from radioactive material.

2. Present State of the Art

In a number of situations it is desirable to be able to quantify the amount of radioactive material within a package. The package may be a container into which waste material has been introduced, the waste being associated with unknown amounts of radioactive material. Other situations also exist.

The existing instruments and methods include a level of error within them. These errors arise particularly from a lack of full accounting for the effects of attenuation and/or the shape and/or the size of the source.

SUMMARY OF THE INVENTION

The present invention has amongst its aims to reduce the level of error in the measurement. It is amongst the aims of the present invention to take into account more fully the position of the radioactive material within the package. It is amongst the aims of the present invention to take into account the suggested nature of the radioactive material, for instance shape and/or size.

According to a first aspect of the invention we provide a method of measuring emissions from radioactive material in a matrix, the method comprising provide a detector for the emissions;
providing the matrix, at least in part, within the field of view of the detector, the matrix having an axis of rotation;
measuring the emissions at a first orientation of the matrix about the axis of rotation, the emissions and orientation forming a first data set;
measuring the emissions at one or more further orientations of the matrix about the axis of rotation, the emissions and orientation at the one or more further orientations forming one or more further data sets;
comparing the emissions detected in the first data set with the emissions detected in one or more of the one or more further data sets, information on the position of the radioactive material relative to the axis of rotation being derived from the variation in the emissions detected between data sets.

According to a second aspect of the invention we provide a method of measuring emissions from radioactive material in a matrix, the method comprising providing a detector for the emissions;
providing the matrix, at least in part, within the field of view of the detector, the detector being rotatably about an axis, the axis of rotation passing through the matrix;
measuring the emissions at a first rotational orientation of the detector about the axis of rotation, the emissions and orientation forming a first data set;
measuring the emissions at one or more further rotational orientations of the detector about the axis of rotation, the emissions and orientation at the one or more further orientations forming one or more further data sets;
comparing the emissions detected in the first data set with the emissions detected in one or more of the one or more further data sets, information on the position of the radioactive material relative to the axis of rotation being derived from the variation in the emissions detected between data sets.

Preferably the axis of rotation is also perpendicular to the axis of the field of view of the detector.

The first aspect and/or second aspect of the invention may include any of the features, options or possibilities set out elsewhere in this application, including those of the third and/or fourth and/or fifth and/or sixth aspects of the invention.

Preferably the measurement of emissions is used to measure the amount of radioactive material in the matrix.

Preferably the matrix or detector is rotated through a series of further orientations and preferably a further data set is obtained for each orientation.

Preferably the variation between the orientation giving the highest measurement of emissions and the orientation giving the lowest level of emissions is considered and most preferably is used to provide the indication of the radial position of the radioactive material.

Preferably the measurement of the amount of radioactive material in the matrix is corrected by applying a correction to the measurement, the correction being given, for that radial position of the radioactive material, by a correction factor.

According to a third aspect of the invention we provide a method of measuring the amount of radioactive material in a matrix by measuring emissions arising from the radioactive material, the method comprising providing a detector for the emissions;
providing the matrix, at least in part, within the field of view of the detector, the matrix having an axis of rotation;
measuring the emissions at a first orientation of the matrix about the axis of rotation, the emissions and orientation forming a first data set;
rotating the matrix about the axis of rotation through a series of further orientations and measuring the emissions at each of those further orientations to form further data sets;
the variation between the emissions detected at the orientation which gives the highest measurement of emissions and the orientation which gives the lowest measurement of emissions indicating the radial position of the radioactive material relative to the axis of rotation;
the measurement of the amount of radioactive material in the matrix being corrected by applying a correction to the measurement, the correction being given by a correction factor for that radial position of the radioactive material.

According to a fourth aspect of the invention we provide a method of measuring the amount of radioactive material in a matrix by measuring emissions arising from the radioactive material the method comprising providing a detector for the emissions;
providing the matrix, at least in part, within the field of view of the detector, the detector being rotatable about an axis of rotation, the axis of rotation passing through the matrix;
measuring the emissions at a first orientation of the detector about the axis of rotation, the emissions and orientation forming a first data set;
rotating the detector about the axis of rotation through a series of further orientations and measuring the emissions at each of those further orientations to form further data sets;
the variation between the emissions detected at the orientation which gives the highest measurement of emissions and the orientation which gives the lowest measurement of emissions indicating the radial position of the radioactive material relative to the axis of rotation; the measurement of the amount of radioactive material in the matrix being corrected by applying a correction to the measurement, the correction being given by a correction factor for that radial position of the radioactive material.

Preferably the axis of rotation is also perpendicular to the axis of the field of view of the detector.

The third and/or fourth aspect of the invention may include any of the features, options or possibilities set out elsewhere in this application, including those of the first and/or second and/or fifth and/or sixth aspects.

The amount of radioactive material maybe expressed as a mass.

The radioactive material may be or include uranium and particularly $U^{235}$. The radioactive material may be or include plutonium.

The matrix may be homogeneous. The matrix may be heterogenous. The matrix may be known. The nature of the matrix may be determined as part of the method or a precursor thereto. The nature of the matrix, particularly its effect on the emissions, may be investigated using a transmission source. Preferably the effect of the matrix on emissions from the transmission source is detected, potentially using the same detector as for the emissions arising within the matrix. Preferably the level and/or characteristics of the transmission source are known.

The matrix may be contained, for instance provided within a package. The effect of the package may be considered as part of the matrix effect. The package may be a crate, drum or the like. The package may be sealed before, during and after the measurement is made.

The emissions may be gamma emissions. The emissions may be neutron emissions.

The detector may be a gamma detector. The detector may be a neutron detector. One or more detectors of the same or different types may be provided.

Preferably the matrix in at least two directions is entirely within the field of view of the detector, ideally at all orientations. Only a part of the matrix need be within the field of view in a third direction, ideally at all orientations. The two directions may be perpendicular to one another and ideally to the third direction too. The two directions may both be perpendicular to the axis of rotation. The third direction may be or be parallel to the axis of rotation. The method may be repeated with different parts of the matrix within the field of view, particularly by moving the matrix and/or detector relative to one another along the third direction and/or by providing one or more further detectors which have different fields of view spaced along the third direction.

Preferably the axis of rotation is vertical. The axis of rotation is preferably perpendicular to at least one surface of the matrix or package containing it, particularly the top and/or bottom surfaces thereof. The axis of rotation may be parallel to one or more surfaces of the matrix or package containing it, particularly the side wall or walls.

Preferably a single axis of rotation is used in the method. Preferably the same axis of rotation is used for packages of the same type.

Preferably the count rate is measured at the orientations.

The first orientation may be a first rotational position or first angle. The further orientations maybe further rotational positions or further angles. The matrix or detector may be rotated between different orientations in a step like manner or more preferably by means of continuous rotation. The first orientation may be a single position or may be a range of positions. The first orientation may thus be an arc through which the matrix or detector rotates. Preferably the range of positions is of the same size and/or the arc is of the same size for each orientation.

The emission measurement, particularly count rate, and orientation of the first and further data sets may be recorded.

Preferably the first orientation is next to a further orientation. The first and further orientations may be next to one another in the form of adjacent angles or may be next to one another in the form of sequential arc ranges. Preferably each further orientation is provided with a further orientation to each side of it, or a further orientation to one side and the first orientation to the other. Preferably the first and further orientations are distributed throughout a range of at least 180° and more preferably 360°. Preferably the first and further orientations provide continuous coverage through a half or full circle about the axis of rotation.

Preferably the first and further orientations provide at least 20, more preferably at least 50 and ideally at least 90 orientations in total.

The orientation giving the highest measurement of emissions and the orientation giving the lowest measurement of emissions may be 180° apart. Variation of zero, or under a small threshold, for instance a threshold equivalent to the noise encountered on the emission measurement may be taken as indicative of a position for the radioactive material on the axis of rotation. Variation above a threshold may be taken as indicating a position at the outside of the matrix relative to the axis of rotation. Variation intermediate to zero or the lower threshold and the upper threshold may be taken as an indication of a position intermediate the axis of rotation and the outside of the matrix.

The position may be determined as a radial position, for instance a distance from the axis of rotation. Additionally, the position may be determined as an angular and radial position, for instance a distance from the axis of rotation and an angle relative to a reference angle. The reference angle may be linked to a feature on the matrix or package containing it.

A plurality of different positions may be indicated for different pieces of radioactive material.

The measurements from one or more of the orientations, preferably all, may be used to provide an uncorrected measurement of the amount of radioactive material in the matrix, particularly that part of the matrix within the field of view of the detector. The uncorrected measurement may be a measured mass of material.

Preferably the uncorrected measurement may be corrected upward or downward or remain the same according to the position and/or size of the material measured.

The correction may be the correction given by the correction factor for the radial position determined. The correction may be the correction given by the correction factor for the radial and angular position determined. The correction may be the correction given for the radial position and/or material size determined.

The form of the correction factor may be determined by a modelling process and/or by a calibration process for the method and particularly for the instrument and/or instrument type used to perform the method. The form of the correction factor may be determined by determining the measured amount and/or measured mass obtained for one or more combinations and the extent of correction needed to correct the measured amount or mass to be the same as the actual amount or mass in a given combination. A combination may comprise a radioactive material size and/or radioactive material radial position and/or radioactive material longitudinal position for one or more pieces of radioactive material. The radioactive material size may be a point source and/or may be a source exhibiting self-shielding.

The determination of the form of the correction factor may include the consideration of at least 500 combinations, more preferably at least 2000 combinations and ideally at least 10000 combinations. Preferably the combinations are randomly selected in terms of radioactive material size and/or radioactive material physical size and/or radioactive material activity and/or radioactive material radial position and/or radioactive material longitudinal position and/or number of pieces of radioactive material.

Preferably a form for the correction factor is derived from the consideration of the combinations and is preferably adjusting in form until a statistically acceptable fit is achieved.

Different forms of the correction factor may derived for different types of package and/or matrix and/or radioactive material and/or size of radioactive material. The form of the correction factor may assume radioactive material is present as a point source. The form of the correction factor may allow for some or all of the radioactive material to be present in self-shielding forms, potentially with different extents of self-shielding.

The correction factor for self-shielding situations may treat the radioactive material as being present in sizes according to a distribution. The distribution may be an exponential distribution, preferably biassed towards the occurrence of point source forms of the radioactive material. The distribution may cause the correction factor to apply a weighted correction to the measured amount or mass.

Preferably the application of the correction converts the measured amount or mass into a corrected amount or mass.

According to a fifth aspect of the invention we provide apparatus for measuring emissions from radioactive material in a matrix, the apparatus comprising a detector which produces signals in response to the detection of the emissions;

signal processing electronics for the signals, the signal processing electronics including a time allocator which allocates a time of detection indication to sets of one or more signals;

a measurement location, on which the matrix is provided in use, the measurement location being capable of rotation about an axis of rotation so as to present the matrix to the detector at a first orientation of the matrix about the axis of rotation and at one or more further orientations of the matrix about the axis of rotation, a set of signals being those signals arising at a particular orientation;

a comparator for comparing the signals of one set with the signals of one or more of the other sets, information on the position of the radioactive material relative to the axis of rotation being derived from the variation in the signals arising between sets.

According to a sixth aspect of the invention we provide apparatus for measuring emissions from radioactive material in a matrix, the apparatus comprising a detector which produces signals in response to the detection of the emissions;

signal processing electronics for the signals, the signal processing electronics including a time allocator which allocates a time of detection indication to sets of one or more signals;

a measurement location, on which the matrix is provided in use, the detector being capable of rotation about an axis of rotation and about the matrix so as to present the matrix to the detector at a first orientation about the axis of rotation and at one or more further orientations about the axis of rotation, a set of signals being those signals arising at a particular orientation;

a comparator for comparing the signals of one set with the signals of one or more of the other sets, information on the position of the radioactive material relative to the axis of rotation being derived from the variation in the signals arising between sets.

Preferably the axis of rotation is also perpendicular to the field of view of the detector.

The apparatus preferably also includes a processor to calculate and/or allocate a correction to the measurement of the amount of radioactive material in the matrix, the correction being given by a correction factor for that radial position of the radioactive material.

Preferably the measurement location is capable of rotational and axial movement. The rotational movement may occur together with axial movement.

The information on the position on the radioactive material relative to the axis of rotation may be expressed as a position on a plane extending about the axis of rotation and/or perpendicular to an axis extending between the measurement location and detector.

The fifth and/or sixth aspect of the invention may include any of the features, options or possibilities set out elsewhere in this application, including those of the first and/or second and/or third and/or fourth aspects.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

The determination of an estimate of the mass of radioactive material in a package is a desirable aim for a variety of reasons. In a common situation there is a need to determine the mass of radioactive material in a package so as to establish the appropriate subsequent handling and storage of the package. Such measurements are also used to control the filling of larger containers with a view to criticality control.

A problem with such measurements is that the radioactive material forms only a small part of the content of the package. The remaining material, the matrix, has an impact on the measurements made. Additionally, the size and/or shape of the radioactive material itself also has an impact.

Figure 1:
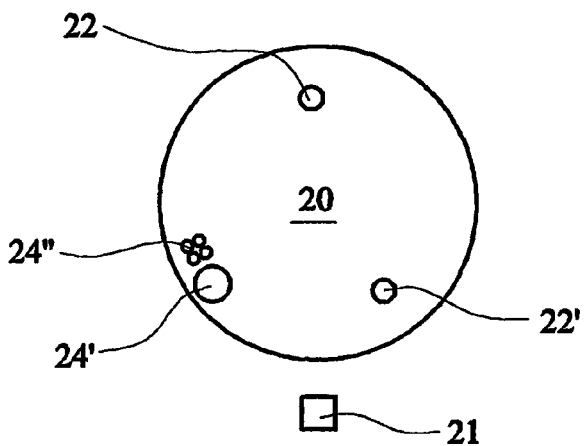
FIG. 1 is a schematic illustration of the impact of radioactive material position and size on measurement.

With regard to the matrix effect, the amount of matrix between the material and the detector of the instrument influences the count rate from a given mass of material. Thus, in FIG. 1, the greater amount of matrix 20 between the detector 21 and the source 22 gives a lower count rate from a given mass of material compared with a source 22', as the level of attenuation of the emissions is higher.

To try and address this issue in existing instruments, rotation of the package occurs during the measurement process. The intention is that by taking the total count for the measurements made throughout the rotation, the risk of a large scale mis-measurement of material near the edge of the package is reduced. Otherwise, if a measurement were made at a single position it would be almost inevitable that the position of the material would skew the measurement. Thus if the material were at a position on the far side of the package a low result would occur, whereas if the material were at the nearside a high result would occur, in these and other cases a non-representative measurement would result. The measurement with rotation is made for each of a series of vertical positions relative to the detector. As a consequence, a series of slices through the package are effectively considered, with the total count for that slice being used in the calculation of the estimated mass for that slice.

With regard to the size of the radioactive material, the amount of material in a discrete mass 24' or in very close proximity 24" is significant, when compared with a point source 22. Materials in a significant mass, 24' or 24", have a self-shielding capacity and this becomes sizable at even small discrete masses. Thus a lump of 1 g of material would give a significantly lower count rate and hence measured mass, than 1 g of material distributed throughout a significant part of the matrix.

The prior art approach does not fully account for the problems caused by the position of the material, makes no estimation of the materials radial position and does not account for material size and/or shape. Hence a number of error sources for the measured mass arise. The level of the error varies with the emissions being considered, particularly their energy. The problem is particularly significant with respect to low energy emissions, such as the 186 keV energy of $U^{235}$ gamma emissions.

In the improved technique of the present invention, the measurement of the count rate from the package is synchronised with the rotation of the package. In an alternative form, particularly suitable for large packages, the detector may be rotated about the package, for instance on a gantry. As a consequence, the count rate will vary with rotation in a manner which is different for different positions within the package. This allows the radial position of the material and/or its actual position within a package to be determined.

Figure 2:
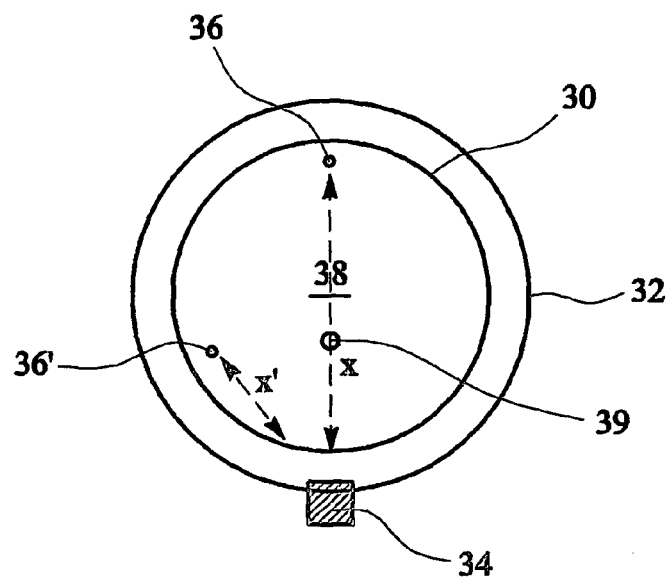
FIG. 2 is a schematic representation of position determining technique of the present invention.
Figure 3:
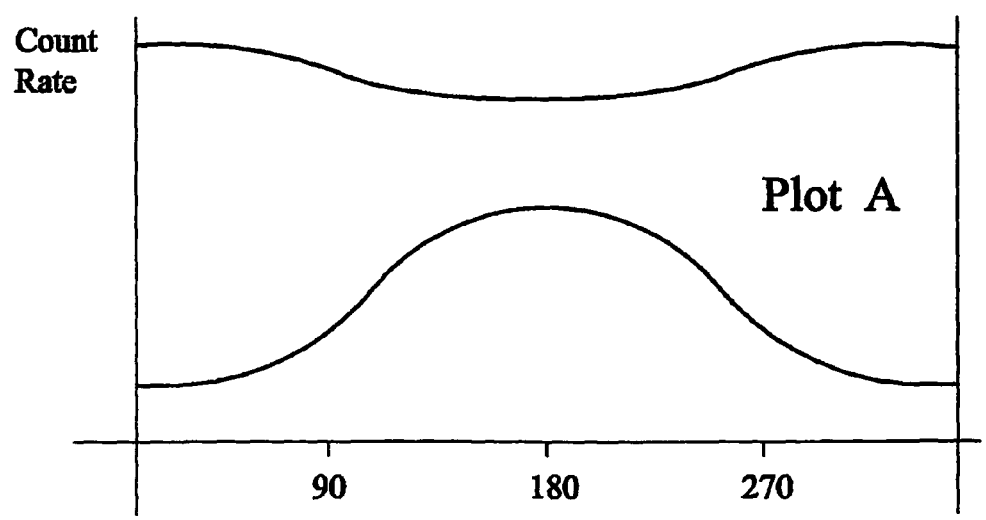
FIG. 3 illustrates the variance in count rate with rotation of a package for different sources.

The principle is illustrated in the schematic plan view of FIG. 2. In this case, the package is a drum 30 which is considered whilst on a turntable 32 which can be rotated. The detector 34 for the high resolution gamma spectroscopy is provided to one side of the drum 30. In the first case the drum 30 contains the material in the form of a first source 36 which is close to the edge of the drum 30 and of relatively low activity. As the measurement process starts the source 36 is on the far side of the drum 30 and of relatively low authority. As a consequence, the attenuation effect of the matrix 38 within the drum 30 is at its greatest as the distance X through the matrix 38 is at its greatest. This is reflected in the count rate plot A of FIG. 3, where the count rate starts at a low level, angle 0°.

As the drum 30 rotates and the angle increases, the source 36 at position 36' comes closer to the detector 34 and the distance through the matrix 38 decreases, distance X'. The result is an increase in the count rate for that position, see plot A of FIG. 3. Further rotation causes the distance to decrease and the count rate to go up. Once the source 36 passes the closest point, angle 180°, and the distance increases again the count rate declines.

The variation in count rate with rotation is high when the separation of the source 36 from the axis of rotation is great. In the case of a different source case, 39, that source 39 is at a position much closer to the axis and hence the variation in the matrix thickness between the source 39 and the detector with rotation is much less. The variation in the count rate with rotation is less as a result and such a case is illustrated in the alternative count rate, plot B, in FIG. 3. The higher count rate is a reflection of source 39 being larger than source 36. A source on axis of rotation may well give no variation with rotation.

Different radial positions for the material detected are reflected in terms of the different shapes of the count rate plots with rotational angle. The extent of the radial distance between the source position determined and the axis can be used as the basis for the correction applied. Different masses are reflected in terms of the different count rate levels. Differences in the radial and angular position of the source are reflected in the different shapes of the count rate plots and the different angle at which the maximum and minimum count rate occurs within that plot respectively. The extent of the radial distance between the source position determined and the axis, together with the angular position could be used as the basis for the correction applied.

Once the position of the material of the source has been determined an appropriate correction can be applied to accurately correct for that position of the material as opposed to other positions. The invention provides for such a positional determination for the first time and for such positional correction for the first time. The correction applied reflects the variation in measurement efficiency of the system for that position. The correction factor is based on the variation in measurement efficiency with position. This efficiency with position can be determined as part of the calibration process for the instrument. The positional information reflects the longitudinal position relative to the axis of rotation in terms of the slice to which the source is allocated and the radial position of the source. The absolute position in terms of longitudinal position, radial position and angular position can form the positional information.

The correction for position involves the application of a correction to the measured mass to give the corrected mass; the aim being that the corrected mass should be the same as the actual mass present or at least as close as possible thereto. The correction for a position is set by the value of a correction factor for that position.

The correction factor takes the general form $$ln(SDCF)=F(V_L,V_A,W_L,W_A)$$

where SDCF is the source distribution correction factor—the correction applied for a given position; F is an empirical correction factor; $V_L$ is the longitudinal detector response variance; $V_A$ is the angular detector response variance; $W_L$ is the longitudinal detector transmission response efficiency, and $W_A$ is the angular detector transmission response efficiency.

To determine the form of the correction factor, a substantial number of known sources and known positions were investigated. This process was performed for both point sources and larger sources and involved the consideration of around 15000 combinations in each case. For a particular combination the count rates lead to a measured mass. This can be compared with the actual mass and hence a correction to convert the measured mass to a corrected mass matching the actual mass determined. The outcome of this consideration for all of the combinations leads to a general form of the correction factor.

Figure 4:
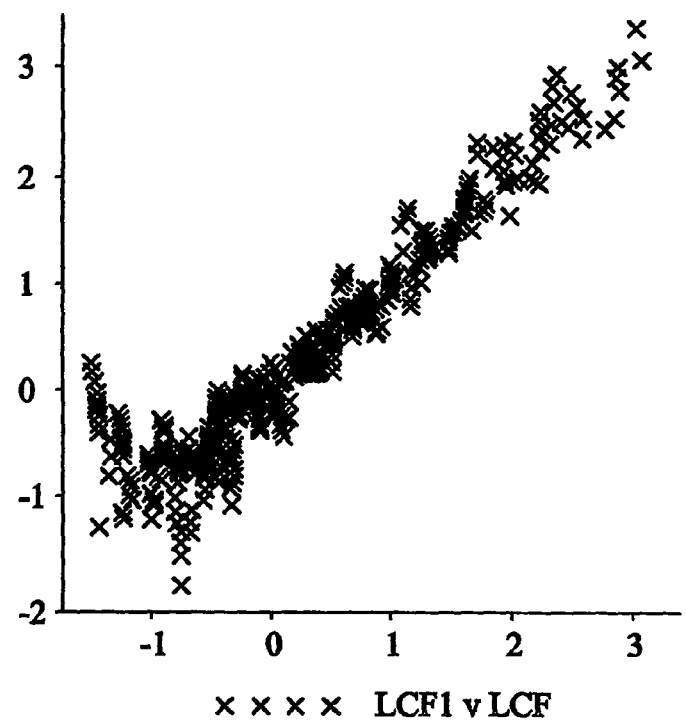
FIG. 4 is a ln plot of the proposed correction factor against full correction factor for a point source in a package.

FIG. 4 is a plot of the correction applied to take the measured mass to a corrected mass, for a large number of combinations, with the correction defined by the correction factor, against the actual correction needed to give a fully corrected mass which matches the actual mass. The plot indicates that for a wide range of situations the correction factor provides a correction very close to the actual correction needed.

Figure 5:
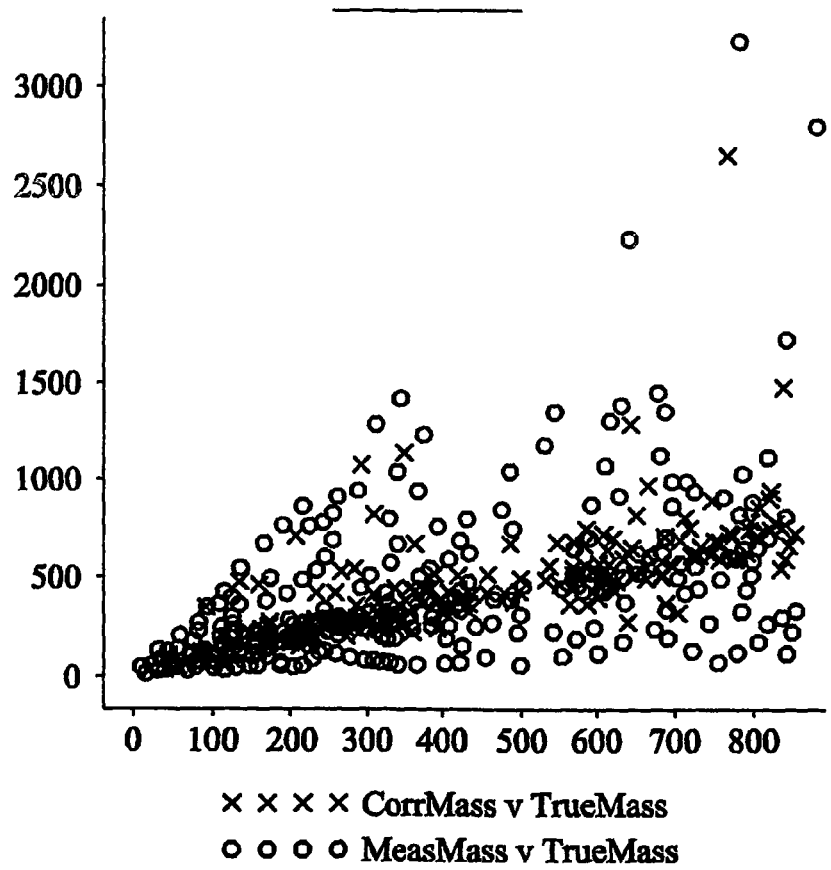
FIG. 5 is a ln plot of uncorrected mass against corrected mass, using the proposed correction factor, for a point source in a package.

In general, the correction needs to reduce the value for those sources near the outside of the drum (the left hand side of the plot) and to increase the value for those sources near the centre of the drum (the right hand side of the plot). The combinations for which the greatest level of discrepancy between the correction suggested by the correction factor and actual correction required exist are those for which the matrix is of high density. Measurement for such matrices is even more problematic using prior art approaches. At matrix densities below 1 g.cm$^{-3}$ the correlation between correction proposed according to the correction factor and the actual correction is very good indeed. This performance is borne out in FIG. 5 where the measured mass for a series of combinations is plotted against the actual mass (red colour/dots plots) and is compared with the corrected mass plotted against the actual mass (black colour/crosses plots).

Whilst the performance of the present invention in respect of point sources is demonstrated above, the technique can also be used to handle sources which are not point and which as a result have a self-shielding effect.

A similar principle is involved in reaching the form of the correction factor in this embodiment of the invention to that used for point sources. Again a very large number of combinations was considered, 15000, with single point, multiple point, single "lump" and multiple "lump" sources present in a full range of different positions and sizes of source. Again the measured and actual masses were considered and a correction determined. The results from all the combinations were used to produce a general form for the correction factor.

Figure 6:
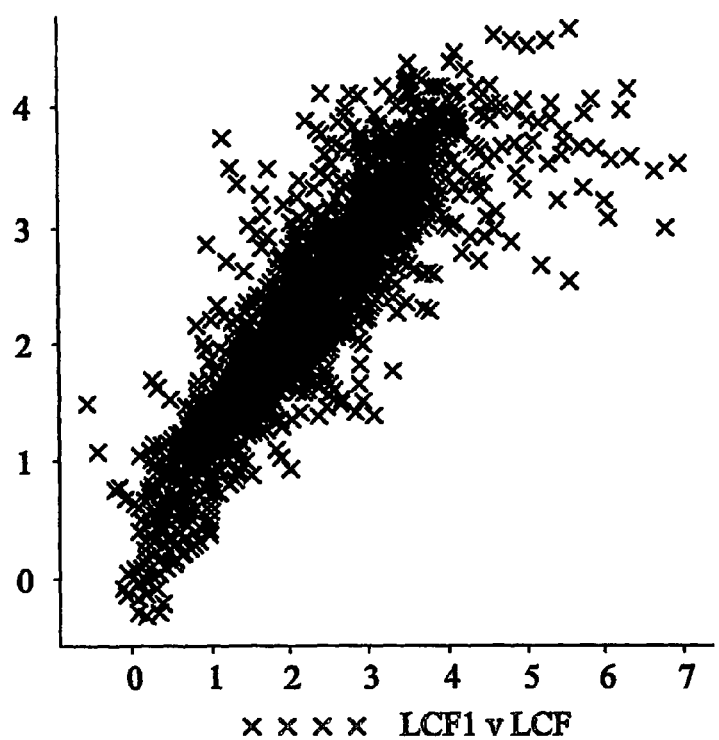
FIG. 6 is a ln plot of proposed correction factor against full correction factor for a self absorbing source in a package.

In FIG. 6, for cases with a matrix of 1 g.cm$^{-3}$ or less, the correction suggested by the correction factor is plotted against the actual correction needed to give a fully corrected mass which matches the actual mass.

In this case, point sources require relatively low correction, where as large "lumps" require substantial correction to account for the self-shielding effect.

When considering the correction to apply, the nature of the material present needs to be determined or assumed.

In one approach, a particle size distribution is assumed to apply to the material in the matrix. As a consequence the correction determined according to the correction factor is weighted according to that distribution. Thus if the distribution indicates a high likelihood of lump sources a predominantly lump source appropriate correction is generated by the correction factor and is applied. In practice, a predominance of smaller sources may be likely and hence an exponential distribution biassed in that way would be used. Other distributions may be applied according to other likely situations, knowledge of source sizes etc.

Figure 7:
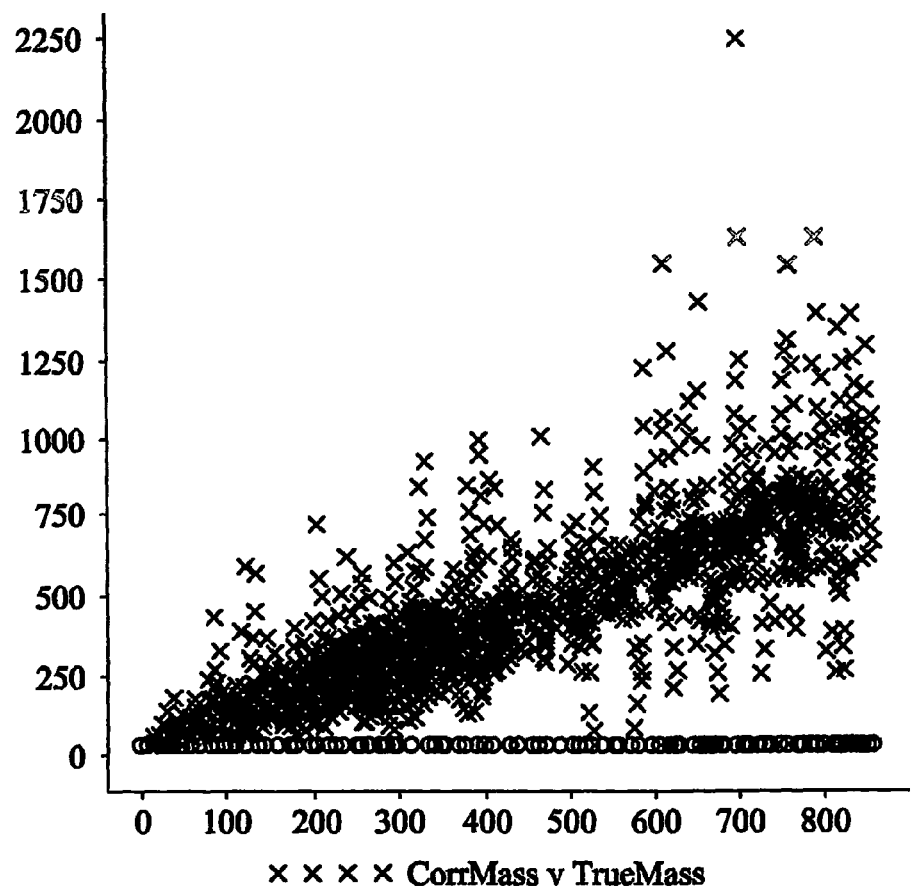
FIG. 7 is a ln plot of uncorrected mass against corrected mass, using the proposed correction factor, for a self absorbing source in a package.

In FIG. 7, the exponential distribution approach is used and a plot of measured mass against actual mass (red colour/dot plots) and corrected mass against actual mass (black colour/ crosses plots) is provided. The corrected mass has a standard error of ~30% compared with up to two orders of magnitude uncorrected.

The technique set out above is applicable to the correction of a wide variety of emission types and in particular to gamma emissions and neutron emissions and instruments which measure them.

The correction applied in its preferred form will also include an account of the matrix type, as different matrices exhibit a significantly different attenuation effect to one another. To establish the matrix in question, a transmission source, whose characteristics in terms of emissions are known, is used. The emissions from the transmission source pass through the package and hence matrix prior to detection. The impact of the matrix on the transmitted emissions can be established by those emissions actually detected and this leads to a proposed matrix type and as a consequence correction.

The invention claimed is:

1. A method of measuring emissions from a single package containing radioactive material in a matrix, the method comprising:
   (i) providing a detector for the emissions;
   (ii) providing the matrix, at least in part, within the field of view of the detector, the matrix having an axis of rotation, the matrix extending in a first direction and the matrix extending in a second direction, the first direction and the second direction being perpendicular to one another and to the axis of rotation, the matrix in the first direction and in the second direction being entirely within the field of view of the detector;
   (iii) measuring the emissions at a first orientation of the matrix about the axis of rotation, the emissions and orientation forming a first data set;
   (iv) measuring the emissions at one or more further orientations of the matrix about the axis of rotation, the emissions and orientation at the one or more further orientations forming one or more further data sets;
   (v) comparing the emissions detected in the first data set with the emissions detected in one or more of the one or more further data sets to calculate a variation in emissions detected between data sets,
      wherein a) the variation is the difference between a highest level of emissions detected and a lowest level of emissions detected, or b) the variation is a shape of a plot of a count or count rate of emissions with rotation, and wherein the radioactive material has a radial position in the matrix and information on the radial position of the radioactive material within the matrix of the single package relative to the axis of rotation being is derived from the variation in the emissions detected between data sets; and
   (vi) repeating steps (ii), (iii), (iv), and (v) for one or more different parts of the matrix by moving the detector and/or single package longitudinally relative to the axis of rotation, thereby providing information on a longitudinal position of the radioactive material within the single package.

2. A method according to claim 1 in which the matrix is rotated through a series of further orientations and a further data set is obtained for each orientation.

3. A method according to claim 1 in which the variation between the orientation giving the highest measurement of emissions and the orientation giving the lowest level of emissions is considered and is used to provide the indication of the radial position of the radioactive material.

4. A method according to claim 1 in which the measurement of the amount of radioactive material in the matrix is corrected by applying a correction to the measurement, the correction being given, for that radial position of the radioactive material, by a correction factor.

5. A method according to claim 1 wherein the variation is the difference between a highest level of emissions detected and a lowest level of emissions detected and the variation gives the radial position of the radioactive material and wherein the emissions have a total level and the total level of emissions is used to calculate the mass of radioactive material.

6. A method according to claim 1 wherein the variation is the shape of a plot of the count or count rate of emissions with rotation and the variation gives the radial position of the radioactive material and wherein the emissions have a total level and the total level of emissions is used to calculate the mass of radioactive material.

7. A method of measuring emissions from a single package containing radioactive material in a matrix, the method comprising:
   (i) providing a detector for the emissions;
   (ii) providing the matrix, at least in part, within the field of view of the detector, the detector being rotatable about an axis, the axis of rotation passing through the matrix, the matrix extending in a first direction and the matrix extending in a second direction, the first direction and the second direction being perpendicular to one another and to the axis of rotation, the matrix in the first direction and in the second direction being entirely within the field of view of the detector;
   (iii) measuring the emissions at a first rotational orientation of the detector about the axis of rotation, the emissions and orientation forming a first data set;
   (iv) measuring the emissions at one or more further rotational orientations of the detector about the axis of rotation, the emissions and orientation at the one or more further orientations forming one or more further data sets;
   (v) comparing the emissions detected in the first data set with the emissions detected in one or more of the one or more further data sets to calculate a variation in emissions detected between data sets,
   wherein a) the variation is the difference between a highest level of emissions detected and a lowest level of emissions detected, or b) the variation is a shape of a plot of a count or count rate of emissions with rotation, and wherein the radioactive material has a radial position in the matrix and information on the radial position of the radioactive material within the matrix of the single package relative to the axis of rotation being is derived from the variation in the emissions detected between data sets; and
   (vi) repeating steps (ii), (iii), (iv), and (v) for one or more different parts of the matrix by moving the detector and/or single package longitudinally relative to the axis of rotation, thereby providing information on a longitudinal position of the radioactive material within the single package.

8. A method according to claim 7 in which the detector is rotated through a series of further orientations and a further data set is obtained for each orientation.

9. A method according to claim 7 in which the variation between the orientation giving the highest measurement of emissions and the orientation giving the lowest level of emissions is considered and is used to provide the indication of the radial position of the radioactive material.

10. A method according to claim 7 in which the method provides a measurement of the amount of radioactive material in the matrix and the measurement of the amount of radioactive material in the matrix is corrected by applying a correction to the measurement, the correction being given, for that radial position of the radioactive material, by a correction factor.

11. A method according to claim 7 wherein the variation is the difference between a highest level of emissions detected and a lowest level of emissions detected and the variation gives the radial position of the radioactive material and wherein the emissions have a total level and the total level of emissions is used to calculate the mass of radioactive material.

12. A method according to claim 7 wherein the variation is the shape of a plot of the count or count rate of emissions with rotation and the variation gives the radial position of the radioactive material and wherein the emissions have a total level and the total level of emissions is used to calculate the mass of radioactive material.

13. A method to provide a measurement of the amount of radioactive material in a matrix in a single package by measuring emissions arising from the radioactive material, the radioactive material having a radial position in the matrix and the method comprising;
   providing a detector for the emissions;
   (ii) providing the matrix, at least in part, within the field of view of the detector, the matrix having an axis of rotation, the matrix extending in a first direction and the matrix extending in a second direction, the first direction and the second direction being perpendicular to one another and to the axis of rotation, the matrix in the first direction and in the second direction being entirely within the field of view of the detector;
   (iii) measuring the emissions at a first orientation of the matrix about the axis of rotation, the emissions and orientation forming a first data set;
   (iv) rotating the matrix about the axis of rotation through a series of further orientations and measuring the emissions at each of those further orientations to form further data sets;
   (v) using a variation that is the difference between the emissions detected at the orientation which gives the highest measurement of emissions and the orientation which gives the lowest measurement of emissions to determine the radial position of the radioactive material within the matrix of the single package relative to the axis of rotation;
   (vi) repeating steps (ii), (iii), (iv), and (v) for one or more different parts of the matrix by moving the detector and/or single package longitudinally relative to the axis of rotation, thereby providing information on a longitudinal position of the radioactive material within the single package; and
   (vii) correcting the measurement of the amount of radioactive material in the matrix by applying a correction to the measurement, the correction being given by a correction factor for that radial position of the radioactive material.

14. A method according to claim 13 in which the matrix has an effect on the emissions and the effect of the matrix on the emissions is investigated using a transmission source.

15. A method according to claim 13 in which the axis of rotation is vertical.

16. A method according to claim 13 which a single axis of rotation is used in the method.

17. A method according to claim 13 in which the first and further orientations are distributed throughout a range of at least 180°.

18. A method according to claim 13 in which angles are expressed relative to a reference angle and the reference angle is linked to a feature on the matrix or package containing it.

19. A method according to claim 13 in which the measurements from one or more of the orientations are used to provide an uncorrected measurement of the amount of radioactive material in the matrix.

20. A method according to claim 19 in which the uncorrected measurement is corrected upward or downward or remains the same according to the position and/or size of the radioactive material measured.

21. A method according to claim 20 in which the correction is the correction given by the correction factor for the radial position determined or the correction is the correction given by the correction factor for the radial and angular position determined or the correction is the correction given for the radial position and/or material size determined.

22. A method according to claim 21 in which the form of the correction factor is determined by a modeling process and/or by a calibration process for the method.

23. A method to provide a measurement of the amount of radioactive material in a matrix in a single package by measuring emissions arising from the radioactive material, the radioactive material having a radial position in the matrix and the method comprising;

providing a detector for the emissions;

(ii) providing the matrix, at least in part, within the field of view of the detector, the detector being rotatable about an axis of rotation, the axis of rotation passing through the matrix, the matrix extending in a first direction and the matrix extending in a second direction, the first direction and the second direction being perpendicular to one another and to the axis of rotation, the matrix in the first direction and in the second direction being entirely within the field of view of the detector;

(iii) measuring the emissions at a first orientation of the detector about the axis of rotation, the emissions and orientation forming a first data set;

(iv) rotating the detector about the axis of rotation through a series of further orientations and measuring the emissions at each of those further orientations to form further data sets;

(v) using a variation that is the difference between the emissions detected at the orientation which gives the highest measurement of emissions and the orientation which gives the lowest measurement of emissions to determine the radial position of the radioactive material within the matrix of the single package relative to the axis of rotation;

(vi) repeating steps (ii), (iii), (iv), and (v) for one or more different parts of the matrix by moving the detector and/or single package longitudinally relative to the axis of rotation, thereby providing information on a longitudinal position of the radioactive material within the single package; and (vii) correcting the measurement of the amount of radioactive material in the matrix by applying a correction to the measurement, the correction being given by a correction factor for that radial position of the radioactive material.

24. A method according to claim 23 in which the nature of the matrix, particularly its effect on the emissions, is investigated using a transmission source.

25. A method according to claim 23 in which the axis of rotation is vertical.

26. A method according to claim 23 which a single axis of rotation is used in the method.

27. A method according to claim 23 in which the first and further orientations are distributed throughout a range of at least 180°.

28. A method according to claim 23 in which the position is determined as an angular and radial position.

29. A method according to claim 23 in which angles are expressed relative to a reference angle and the reference angle is linked to a feature on the matrix or package containing it.

30. A method according to claim 23 in which the measurements from one or more of the orientations are used to provide an uncorrected measurement of the amount of radioactive material in the matrix.

* * * * *